Nov. 26, 1957  LE ROY G. ZIMMER  2,814,174
COMBINE DIVIDING BOARD ATTACHMENT
Filed April 10, 1956

Le Roy G. Zimmer
INVENTOR.

United States Patent Office 2,814,174
Patented Nov. 26, 1957

2,814,174

COMBINE DIVIDING BOARD ATTACHMENT

Le Roy G. Zimmer, Two Rivers, Wis.

Application April 10, 1956, Serial No. 577,272

2 Claims. (Cl. 56—314)

The present invention relates to a readily applicable and removable attachment, a surface contacting runner for example, for the underneath portion of the outside dividing board of a combine, for instance, a self-propelled machine for gathering and harvesting all so-called combineable crops.

As is generally well known the cutter bar of a combine is hydraulically controlled, that is, raised or lowered in keeping with the requirements of the varying irregularities and contour of the land. Although the range of cutting height is from approximately 2½ inches to 35 inches it is nevertheless a situation which involves a certain amount of guesswork by the operator and is often perplexing and difficult to continuously cope with. Posing the stated problem, as it does, the objective in the instant endeavor is to minimize manual operational requirements by providing a runner or shoe which slides over the surface and avoids dragging contact of the dividing board with the surface by reason of the fact that the runner not only elevates the divider, but, at the same time avoids clogging of the divider with fallen and matted grain and weeds.

Wherever and whenever combines are used, the operator, usually the farmer, strives to do a clean efficient job but is constantly confronted with difficulties arising from fallen or down entangled grain. The instant invention seeks to speed up the job so that advantage can be taken of harvesting hours and the machine guided through the heaviest stand of grain at an unhampered pace and speed of operation.

Briefly, the invention in its preferred embodiment is characterized, as already hinted above, by a longitudinally bowed metal or equivalent flat-bottomed strap rigid and fashioned into an elongated runner. Adapter brackets serve to secure the trailing or rear end of the runner to the underneath cooperating portion of the divider and an appropriately shaped socket serves to accommodatingly receive and hold the pointed leading end of the divider therein, all in a manner to be more particularly described.

Other objects, features and advantages will become more readily apparent from the following description and the accompanying sheet of illustrative drawings.

In the accompanying drawings wherein like numerals are employed to designate like parts throughout the same:

Figure 1:
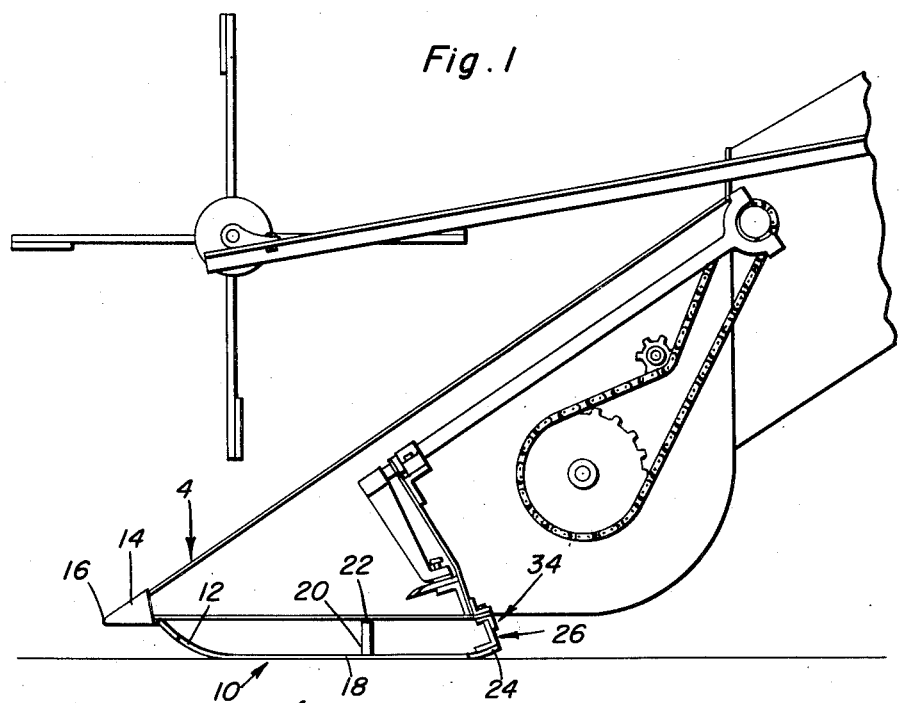
Figure 1 is a view in elevation showing portion of a conventional combine and showing with particularity one of the outside dividing boards and the attachment or runner mounted thereon.
Figure 2:
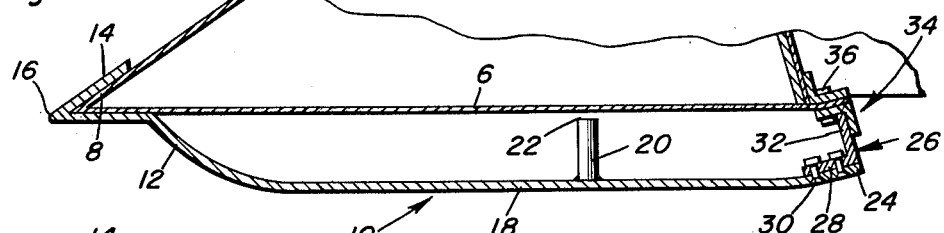
Figure 2 is a fragmentary view, primarily in section, disclosing the details with particularity.
Figure 3:
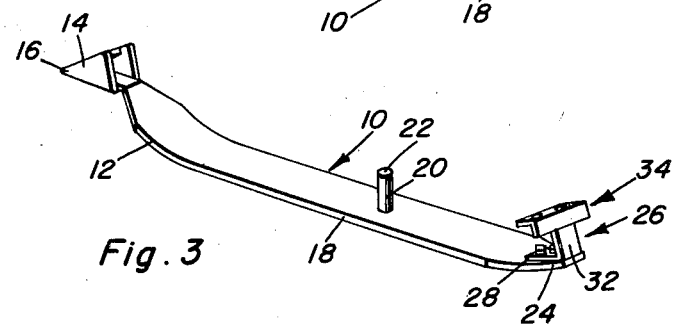
Figure 3 is a perspective view of the runner attachment by itself.

Referring now to the drawings the outside dividing board is denoted, as a structural entity, by the numeral 4 and has a bottom portion 6 and a substantially V-shaped or pointed leading end portion 8. Taking advantage of the latter feature the improved attachment or runner 10 has a curvate or upwardly and forwardly bowed portion 12 terminating in a substantially V-shaped socket member 14 the forwardly directed vertex or pointed end of which is denoted at 16. This end pilots itself into the stand of grain (not shown). The receptacle or socket portion serves to conformingly receive and pocket the end portion 8 thus satisfactorily attaching the forward or leading end of the runner to the dividing board. The main or body portion of the runner is denoted at 18 and is spaced below the bottom of the divider 4 and it is provided on its upper side and intermediate its ends with an upstanding rigid stud 20 which constitutes an abutment. The upper end 22 is normally spaced below the divider bottom or surface 6. The rear or terminal end of the runner is denoted at 24 and is provided with a substantially L-shaped bracket 26. The horizontal leg 28 is superimposed on and bolted in place as at 30 and the vertical leg 32 extends up and is provided with a suitably attached angle member or cleat 34. This in turn has bolt holes therein to accommodate the bolts 36 which function to join the two brackets 26 and 34 to the overhead and cooperating portion of the divider.

With the shoe-like runner in place contact of the dividing board with the land is substantially overcome. Consequently, the runner attachment elevates the latter and avoids clogging and stalling in tangled grain and weeds. It lessens the likelihood of picking up stones and consequent breakage of the grain guards. In fact, with this attachment manual operation is no longer necessary inasmuch as the machine rides on the runner and moves in and through depressions and over elevations of the land without requiring the attention of the operator or the raising or lowering of the cutting bar by way of the usual hydraulic means. Being quite simple and practical the invention fulfills the requirements and economies of manufacturers and the everyday needs of farmers and other users.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for a combine dividing board comprising an elongated runner having a substantially straight resilient body portion, a rear trailing end portion provided with a pair of cooperating attaching brackets, an upwardly and forwardly curved leading end portion, a socket member fixed on said leading end portion, said socket member being substantially V-shaped and adapted to receive and retain a correspondingly shaped leading end on a dividing board, and a stud fixed to and rising from an intermediate part of said body portion, said stud being adapted to abut a predetermined portion of said dividing board under certain operating conditions and being of a height wherein its upper end is disposed in a plane below the plane of the bottom portion of the socket member.

2. An attachment for a combine dividing board comprising an elongated longitudinally bowed flat-bottom resilient metal strap fashioned into and constituting a runner, said runner being adapted to underlie the predetermined lower portion of said dividing board and having a substantially straight resilient body portion and an upwardly and forwardly curved leading end portion terminating in an integral socket member which is adapted to receive and retain a cooperating leading end portion on said dividing board, a vertical stud attached to and rising from an intermediate part of the upper side of said body portion, said stud serving as a stop and being intended to abut a predetermined portion of the overlying dividing board when the runner is under predetermined stress or strain, the upper end of said stud terminating in a plane below the plane of the bottom portion of said socket member, a first bracket secured to the trailing end portion of said runner and raising vertically therefrom, and a second bracket mounted on said first bracket and adapted to be bolted or otherwise secured on a predetermined part of the combine divider on which said attachment is, at the time, being used.

References Cited in the file of this patent

UNITED STATES PATENTS

| | | |
|---|---|---|
| 607,704 | Pitcher | July 19, 1898 |
| 1,272,628 | Crawford | July 16, 1918 |
| 1,866,948 | Robertson | July 12, 1932 |
| 2,746,231 | Ayers | May 2, 1956 |